(12) United States Patent
Zhang et al.

(10) Patent No.: US 9,780,883 B2
(45) Date of Patent: *Oct. 3, 2017

(54) SYSTEM AND METHOD FOR MULTI-DIMENSIONAL MODULATION USING MULTIPLE CONSTELLATIONS

(71) Applicant: Tyco Electronics Subsea Communications LLC, Eatontown, NJ (US)

(72) Inventors: Hongbin Zhang, Marlboro, NJ (US); Hussam G. Batshon, Neptune, NJ (US)

(73) Assignee: TYCO ELECTRONICS SUBSEA COMMUNICATIONS LLC, Eatontown, NJ (US)

(*) Notice: Subject to any disclaimer, the term of this patent is extended or adjusted under 35 U.S.C. 154(b) by 46 days.

This patent is subject to a terminal disclaimer.

(21) Appl. No.: 14/631,778

(22) Filed: Feb. 25, 2015

(65) Prior Publication Data

US 2016/0127046 A1 May 5, 2016

Related U.S. Application Data

(63) Continuation-in-part of application No. 14/529,414, filed on Oct. 31, 2014.

(51) Int. Cl.
*H04B 10/04* (2006.01)
*H04B 10/12* (2006.01)
(Continued)

(52) U.S. Cl.
CPC ..... *H04B 10/5161* (2013.01); *H04B 10/5561* (2013.01); *H04L 27/183* (2013.01);
(Continued)

(58) Field of Classification Search
CPC ...... H04B 10/06; H04B 10/04; H04B 10/564; H04J 14/00; H04L 1/0065
(Continued)

(56) References Cited

U.S. PATENT DOCUMENTS 7,111,226 B1 * 9/2006 Cameron ............ H03M 13/256
714/794
8,295,713 B2 10/2012 Cai
(Continued)

FOREIGN PATENT DOCUMENTS

EP 2747311 6/2014

OTHER PUBLICATIONS

Millar et al; "Blind Adaptive Equalization of Polarization-Switched QPSK Modulation;" Optics Express; 8533; Apr. 25, 2011; vol. 19, No. 9.
(Continued)

*Primary Examiner* — David Payne
*Assistant Examiner* — Pranesh Barua

(57) ABSTRACT

A system and method including multi-dimensional coded modulation wherein symbols within successive blocks of symbols are mapped using at least two different constellations to differentiate the symbols from each other. At least one data bit is encoded by an order of the symbols within each block of symbols. The receiver decodes the data by decoding at least one bit from the order of the symbols mapped with the first and second constellations.

14 Claims, 10 Drawing Sheets

(51) Int. Cl.
    *H04B 10/516*     (2013.01)
    *H04L 27/34*     (2006.01)
    *H04L 27/36*     (2006.01)
    *H04B 10/556*     (2013.01)
    *H04L 27/18*     (2006.01)

(52) U.S. Cl.
    CPC ...... *H04L 27/3405* (2013.01); *H04L 27/3472* (2013.01); *H04L 27/367* (2013.01)

(58) Field of Classification Search
    USPC .................................................. 398/182, 185
    See application file for complete search history.

(56) References Cited

U.S. PATENT DOCUMENTS

| | | | |
|---|---|---|---|
| 8,775,892 B2 | 7/2014 | Zhang et al. | |
| 2004/0255221 A1* | 12/2004 | Shen | G11B 20/18 714/752 |
| 2007/0011595 A1* | 1/2007 | Cameron | H03M 13/256 714/796 |
| 2007/0121742 A1* | 5/2007 | Tamaki | H03M 13/2957 375/260 |
| 2009/0060090 A1* | 3/2009 | Ban | H04L 5/0007 375/308 |
| 2010/0091899 A1* | 4/2010 | Shimizu | H03M 13/258 375/262 |
| 2013/0216221 A1* | 8/2013 | Zhang | H04L 1/0057 398/43 |
| 2015/0349894 A1* | 12/2015 | Renaudier | H04B 10/5161 398/183 |

OTHER PUBLICATIONS

Batshon et al., "Multidimensional SPC-based bit-interleaved coded-modulation for spectrally-efficient optical transmission systems," Proceedings of International Society for Optical Engineering (SPIE) (2013) 9008:90080F1-90080F6.

International Search Report dated Jan. 26, 2016 received in counterpart PCT Application No. PCT/US2015/056557.

* cited by examiner

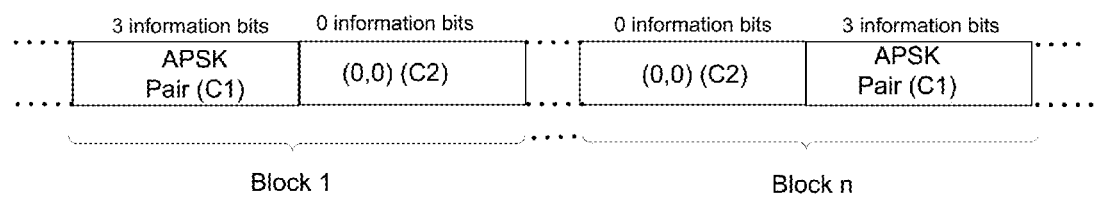
FIG. 11
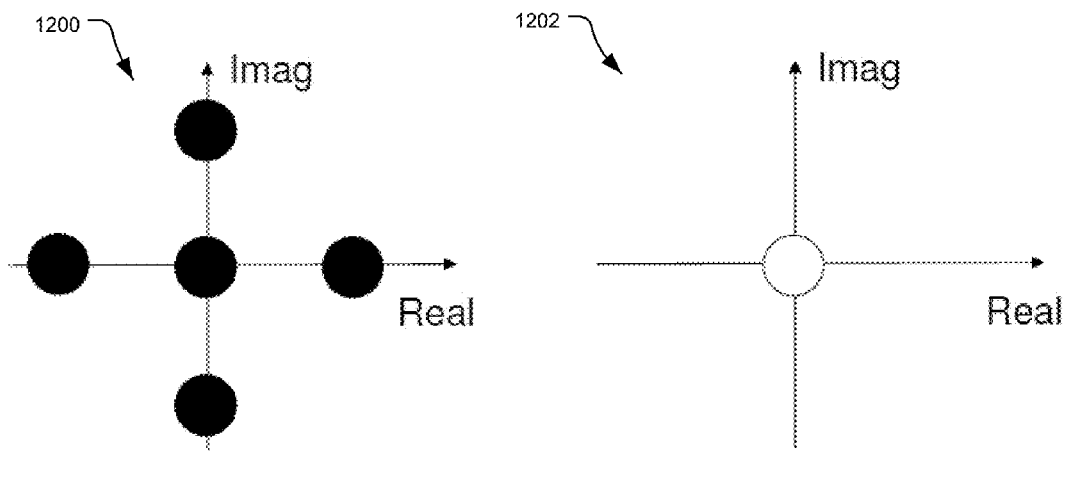
First Constellation
FIG. 12A
Second Constellation
FIG. 12B

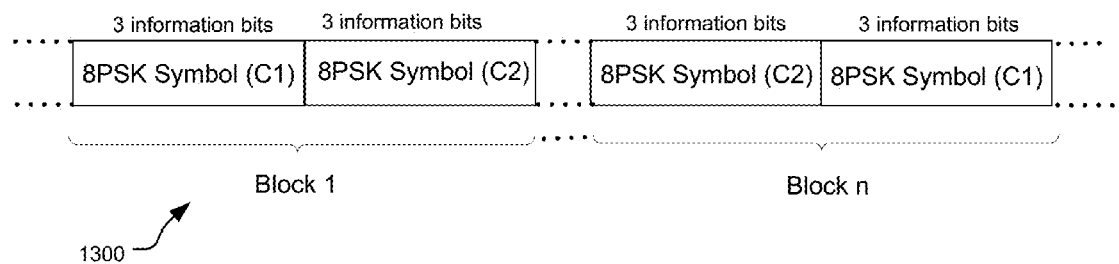
FIG. 13
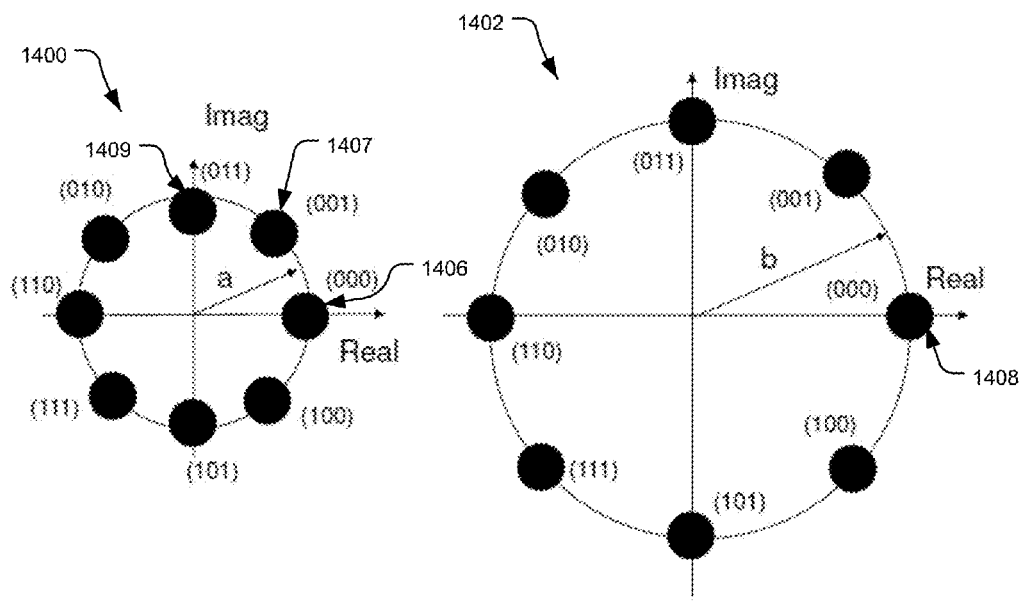
First Constellation C1
FIG. 14A
Second Constellation C2
FIG. 14B

SYSTEM AND METHOD FOR MULTI-DIMENSIONAL MODULATION USING MULTIPLE CONSTELLATIONS

CROSS-REFERENCE TO RELATED APPLICATIONS

The present application is a continuation-in-part of U.S. patent application Ser. No. 14/529,414, filed Oct. 31, 2014, the entire disclosure of which is hereby incorporated herein by reference.

TECHNICAL FIELD

The present disclosure relates to optical signal data detection and more particularly, to a system and method for multi-dimensional modulation using multiple constellations.

BACKGROUND

In wavelength division multiplexed (WDM) optical communication systems, a number of different optical carrier wavelengths are separately modulated with data to produce modulated optical signals. The modulated optical signals are combined into an aggregate signal and transmitted over an optical transmission path to a receiver. The receiver detects and demodulates the data.

One type of modulation that may be used in optical communication systems is phase shift keying (PSK). According to different variations of PSK, data is transmitted by modulating the phase of an optical wavelength such that the phase or phase transition of the optical wavelength forms a symbol representing one or more bits. In a binary phase-shift keying (BPSK) modulation scheme, for example, two phases may be used to represent one bit per symbol. In a quadrature phase-shift keying (QPSK) modulation scheme, four phases may be used to represent two bits per symbol. Other PSK formats include amplitude phase shift keying (APSK) and differential phase shift keying (DPSK) formats and variations of PSK and DPSK formats, such as return-to-zero DPSK (RZ-DPSK) and polarization division multiplexed QPSK (PDM-QPSK).

Quadrature amplitude modulation (QAM) broadly describes a modulation format wherein data is represented using phase shift keying with or without amplitude shift keying. For example, a 16-QAM modulation format uses phase shift keying and amplitude shift keying to represent four bits per symbol. PSK modulation schemes may be broadly viewed as QAM schemes and may be referred to as a level of QAM. For example, BPSK may be referred to as 2 QAM and QPSK may be referred to as 4 QAM.

Data bits are mapped to QAM signals according to a signal constellation. A signal constellation is a predetermined plan or map indicating how information bits correspond to associated symbols modulated on an optical signal. The constellation is typically represented as a two-dimensional scatter diagram in the complex plan. The real and imaginary axes of the complex plane often called the in-phase, or I-axis, and the quadrature, or Q-axis, respectively. For a particular modulation format, the constellation identifies the exact information bits that correspond to each symbol (having real and imaginary values) modulated on an optical wavelength.

One problem associated with optical communication systems is maintaining the integrity of the data being communicated, particularly when optical signals are transmitted over long distances in long-haul communication systems. Accumulated noise contributed by many different sources in a transmission path may cause degradation of the signals and may cause difficulty in differentiating between the binary digits (i.e., the ones and zeros) in a data stream.

Forward Error Correction (FEC) is a technique used to help compensate for this degradation. FEC is essentially the incorporation of a suitable code into a data stream at the transmitter. The transmitter receives a data stream and encodes the data stream using an FEC encoder that introduces some redundancy in the binary information sequence of the data stream. The receiver receives the encoded data and runs it through an FEC decoder to detect and correct errors.

When an FEC code is combined with a modulation format, the system may be described as including a coded modulation. One example of a coded modulation is known as bit-interleaved coded-modulation (BICM). In a BICM scheme FEC coding is applied to a data stream and the FEC coded data stream is then bit-interleaved (i.e. the order of the bits is permuted). The coded and interleaved data stream is then modulated according to a selected data modulation. The performance of BICM can be further increased in some cases by exchanging information between the de-mapper and the decoder and performing iterative decoding (ID). BICM schemes with ID decoding are known as BICM-ID schemes. A modified BICM-ID coded modulation scheme is described in U.S. Pat. No. 8,775,892 (the '892 patent), the teachings of which are hereby incorporated herein by reference.

BRIEF DESCRIPTION OF THE DRAWINGS

Reference should be made to the following detailed description which should be read in conjunction with the following figures, wherein like numerals represent like parts:

FIG. 11 diagrammatically illustrates another modulated output of an exemplary transmitter consistent with the present disclosure.

FIG. 12A is a constellation diagram of showing one example of a constellation useful in connection with the output shown in FIG. 11.

FIG. 12B is a constellation diagram of showing one example of another constellation useful in connection with the output shown in FIG. 11.

FIG. 13 diagrammatically illustrates another modulated output of an exemplary transmitter consistent with the present disclosure.

FIG. 14A is a constellation diagram of showing one example of a constellation useful in connection with the output shown in FIG. 13.

FIG. 14B is a constellation diagram of showing one example of another constellation useful in connection with the output shown in FIG. 13.

DETAILED DESCRIPTION

In general, a system consistent with the present disclosure implements a multi-dimensional coded modulation scheme wherein symbols within successive blocks of symbols are mapped using two different constellations to differentiate the symbols from each other. At least one data bit is encoded by an order of the symbols within each block of symbols. The receiver decodes the data by decoding at least one bit from the order of the symbols mapped with the first and second constellations.

As used herein an "FEC code" refers to a scheme whereby one or more bits (the overhead associated with the code) are added to a data stream to assist in detection or correction of data errors. As used herein a "map" or "mapping" refers to a known scheme whereby a code is assigned to each of a contiguous set of bits and does not involve adding additional bits to a data stream (i.e. mapping has no overhead). The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Figure 1:
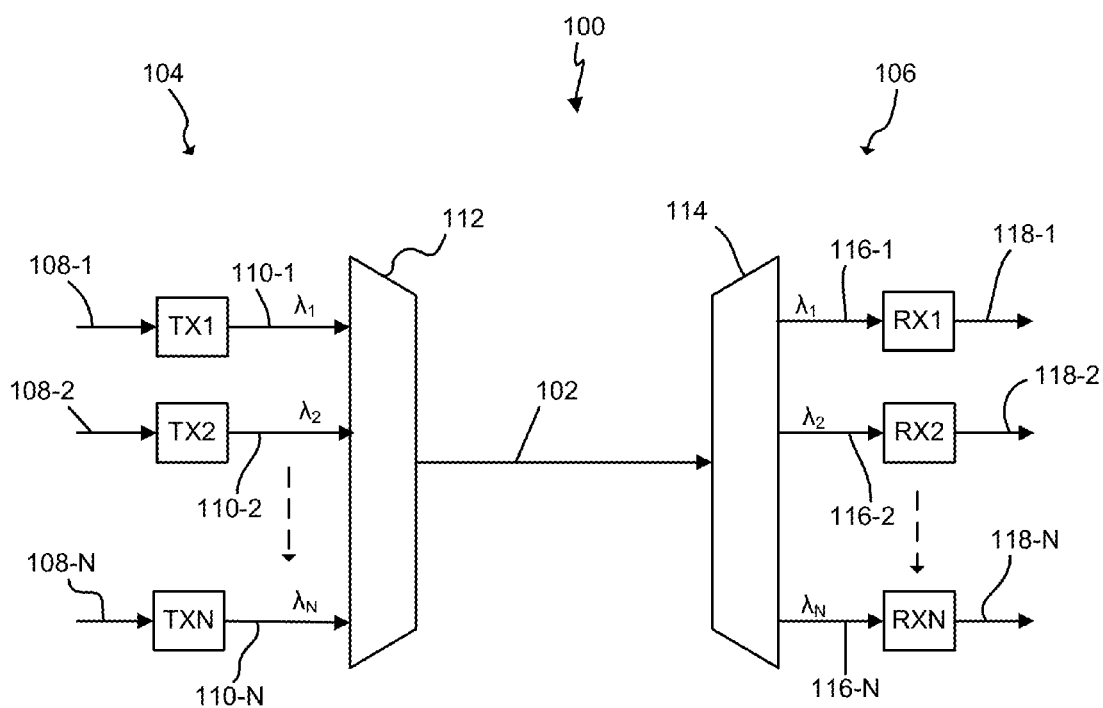
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1$, $\lambda_2$ . . . $\lambda_N$. One or more of the transmitters TX1, TX2 . . . TXN may be configured to modulate data on the associated wavelength in blocks of symbols with multiple constellations consistent with the present disclosure. The transmitters are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal and may provide an associated output data signal on an associated output path 118-1, 118-2, 118-3, 118-N.

Figure 2:
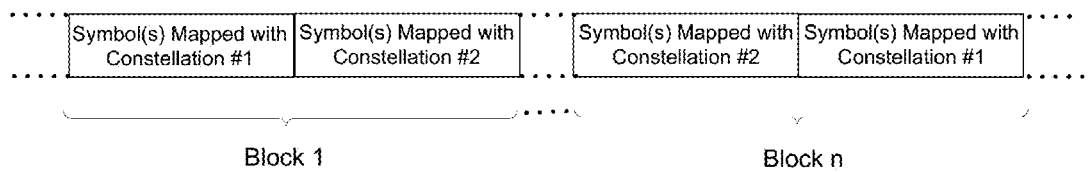
FIG. 2 diagrammatically illustrates a modulated output of an exemplary transmitter consistent with the present disclosure.

FIG. 2 diagrammatically illustrates one example 200 of an output of a transmitter TX1, TX2 . . . TXN configured to modulate data on the associated wavelength with using multiple constellations consistent with the present disclosure. As shown, blocks of information bits may be mapped by a transmitter TX1, TX2 . . . TXN to associated blocks of symbols, Block 1 . . . Block n, modulated on the wavelength $\lambda_1, \lambda_2 \ldots \lambda_N$ associated with the transmitter. In the illustrated embodiment, a first block of symbols, Block 1, includes symbol(s) mapped according to a first constellation followed by symbol(s) mapped according to a second constellation that is different from the first constellation. The nth block, Block n, includes symbol(s) mapped according to the second constellation followed by symbol(s) mapped according to the first constellation.

Advantageously, in a system consistent with the present disclosure the transmitter TX1, TX2 . . . or TXN is configured to encode at least one information bit in the order of the symbols within each block of symbols. At the receiver, the information bit encoded in the order of the symbols is decoded by discerning the order of the symbols from the differences in their signal constellations. For example, to encode a digital "1" the transmitter may transmit signals mapped according to the first constellation followed by signals mapped according to the second constellation, e.g. as shown in Block 1. To encode a digital "0" the transmitter may transmit signals mapped according to the second constellation followed by signals mapped according to the first constellation, e.g. as shown in Block n. This is illustrated in Table 1 below:

TABLE 1

| Order of Symbols | Additional Bit Encoded By the Order of the Symbols |
|---|---|
| Symbol(s) Mapped with Constellation #1 followed by Symbols Mapped with Constellation #2 | 1 |
| Symbol(s) Mapped with Constellation #2 followed by Symbols Mapped with Constellation #1 | 0 |

The receiver identifies the order of the symbols from the differences between the first and second constellations to decode the bit that was encoded in the order of the symbols by the transmitter.

Encoding at least one data bit in the order of symbols within a block of symbols increases the spectral efficiency of the modulation scheme. In a particularly advantageous embodiment, encoding additional bit(s) in the order of symbols within a block of symbols using different constellations may be combined with a modulation format that allows for increased SNR sensitivity at the receiver, e.g. an APSK format as compared to a QPSK format, etc. Formats that provided an increase in SNR sensitivity at the receiver may have a reduced spectral efficiency, but the additional bits encoded in the order of the symbols in a system consistent with the present disclosure offset the reduction the spectral efficiency. As such combining, for example, APSK modulation and QPSK, etc. with a system consistent with the present disclosure may achieve increased SNR sensitivity without the corresponding reduction in spectral efficiency. In such an embodiment, the number of symbols in each block and the number of different signal constellations may be selected to encode one or more additional bits in the order of the symbols.

Figure 3:
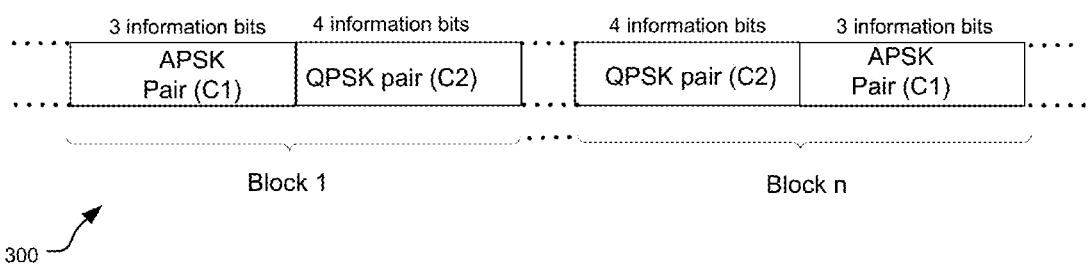
FIG. 3 diagrammatically illustrates another modulated output of an exemplary transmitter consistent with the present disclosure.

FIG. 3, for example, diagrammatically illustrates one example 300 of an eight-dimensional coded modulation that may be established using blocks of symbols including a pair of APSK symbols along with another pair of QPSK symbols. The QPSK pair may represent four information bits (two bit/symbol) and the APSK pair may represent three information bits (1.5 bits/symbol). Each symbol of the APSK pair may be mapped according to a first constellation and each symbol of the QPSK pair may be mapped according to a second constellation that is different from the first constellation.

An additional information bit may be encoded in the order of the pairs of symbols. For example, to encode a digital "1" the transmitter may transmit the APSK pair mapped according to the first constellation followed by the QPSK pair mapped according to the second constellation, e.g. as shown in Block 1 of FIG. 3. To encode a digital "0" the transmitter may transmit the QPSK pair mapped according to the second constellation followed by the APSK pair mapped according to the first constellation, e.g. as shown in Block n of FIG. 3.

Figures 4A, 4B:
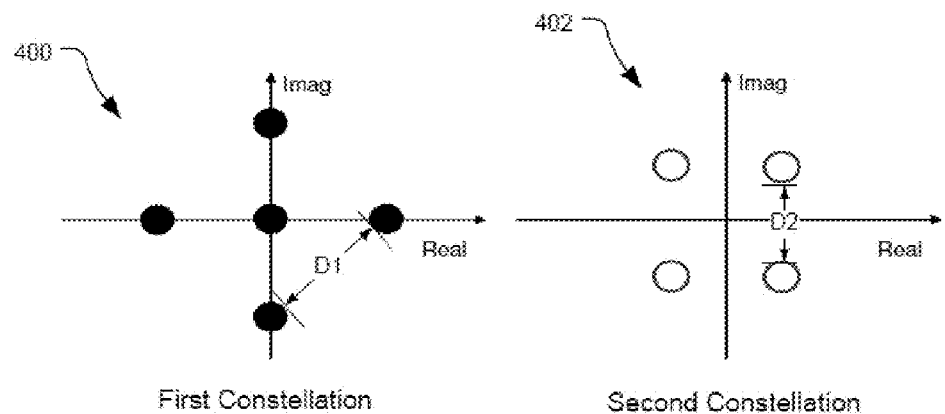
FIG. 4A is a constellation diagram of showing one example of a constellation useful in a system consistent with the present disclosure.
FIG. 4B is a constellation diagram of showing one example of another constellation useful in a system consistent with the present disclosure.

The constellations used to map the symbols may be constellations that are sufficiently different to allow the receiver to decode the bit(s) encoded in the order of the symbols by the transmitter. The constellations may have any relative amplitude size and/or phase as long as the receiver can decode the bit(s) encoded in the order of the symbols. For example, FIG. 4A illustrates one example of a first constellation 400 for mapping each symbol of the APSK symbol pairs shown in FIG. 3, and FIG. 4B illustrates one example of a second constellation 402 for mapping each symbol of the QPSK symbol pairs shown in FIG. 3. The relative amplitude of the constellations in FIGS. 4A and 4B may be set so that the minimum Euclidean distance, D1, between adjacent symbols in FIG. 4A is the same as, or different from, the minimum Euclidean distance, D2, between adjacent symbols in FIG. 4B.

Figure 4C:
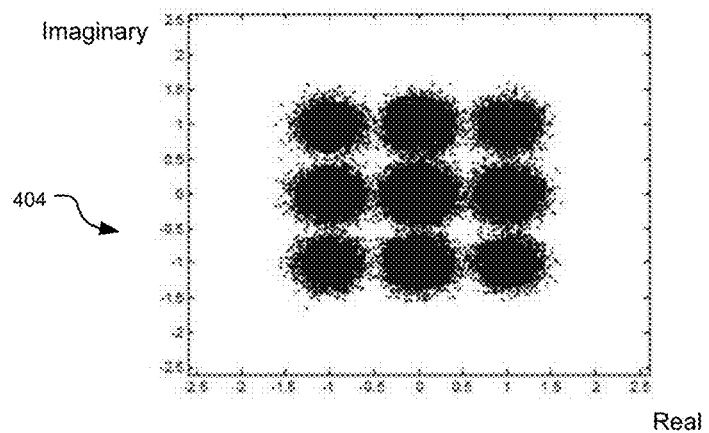
FIG. 4C is a constellation diagram associated with one example of an 8-bit multi-dimensional symbol consistent with the present disclosure.
Figure 4D:
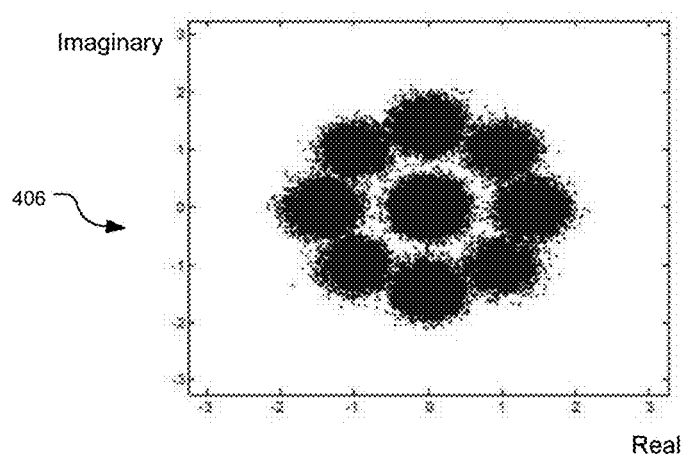
FIG. 4D is a constellation diagram associated with another example of an 8-bit multi-dimensional symbol consistent with the present disclosure.

For example, setting the power of the APSK symbol pairs to be the same as the power of the QPSK symbol pairs would result in a difference between the minimum Euclidean distances D1, D2. FIG. 4C is a constellation diagram 404 associated with the 8-bit multi-dimensional symbol established by the combination of a pair of APSK symbols and a pair of QPSK symbols as shown in FIG. 3 when the APSK symbol pairs and the QPSK symbol pairs have the same power and different Euclidean distances, D1, D2, i.e. one of the Euclidean distances D1 or D2 is larger than the other of the Euclidean distances D1 or D2. In another example, relative power of the APSK symbol pair and the QPSK symbol pair can be set so that the minimum Euclidean distances D1, D2 are nominally equal. FIG. 4D, for example, is a constellation diagram 406 associated with the 8-bit multi-dimensional symbol established by the combination of a pair of APSK symbols and a pair of QPSK symbols as shown in FIG. 3 when the constellation of associated with the QPSK signal pairs (FIG. 4B) is $\sqrt{2}$ that of the amplitude of the constellation associated with the APSK signal pairs (FIG. 4A) so that D1 and D2 are equal. In some embodiments, the performance of a system and method consistent with the present disclosure may be improved when D1 is nominally equal to D2.

The pairs of APSK symbols (C1) shown in FIG. 3, each of which is mapped according to the constellation in FIG. 4A, may include first and second symbols A1, A2, respectively. In one embodiment, for example, the APSK pair, C1=(A1, A2), may be mapped using the constellation in FIG. 4A to associated information bits (a1,a2,a3) according to Table 2 below:

TABLE 2

| A1 Constellation Point | A2 Constellation Point | Information bits $(a_1a_2a_3)$ |
|---|---|---|
| −2j | 0 | 000 |
| −2 | 0 | 001 |
| 0 | −2j | 010 |
| 0 | 2 | 011 |
| 0 | −2 | 100 |
| 0 | 2j | 101 |
| 2 | 0 | 110 |
| 2j | 0 | 111 |

The pairs of QPSK symbols (C2) in FIG. 3, each of which is mapped according to the constellation in FIG. 4B, may include first and second symbols B1, B2, respectively. The QPSK pair, C2=(B1, B2), may be mapped using the constellation in FIG. 4B to associated information bits (b1,b2, b3,b4) according to Table 3 below:

TABLE 3

| B1 Constellation Point | B2 Constellation Point | Bits $(b_1b_2\ b_3b_4)$ |
|---|---|---|
| −1 − j | −1 − j | 0000 |
| −1 − j | −1 + j | 0001 |
| −1 − j | 1 − j | 0010 |
| −1 − j | 1 + j | 0011 |
| −1 + j | −1 − j | 0100 |
| −1 + j | −1 + j | 0101 |
| −1 + j | 1 − j | 0110 |

TABLE 3-continued

| B1 Constellation Point | B2 Constellation Point | Bits ($b_1b_2\,b_3b_4$) |
|---|---|---|
| −1 + j | 1 + j | 0111 |
| 1 − j | −1 − j | 1000 |
| 1 − j | −1 + j | 1001 |
| 1 − j | 1 − j | 1010 |
| 1 − j | 1 + j | 1011 |
| 1 + j | −1 − j | 1100 |
| 1 + j | −1 + j | 1101 |
| 1 + j | 1 + j | 1111 |

With this mapping and with an additional bit encoded in the order of C1 and C2, the embodiment shown in FIG. 3 provides an eight-dimensional modulation with information bits encoded according to table 4 below:

TABLE 4

| Order of Symbols | Bit encoded by the order of the symbols | Information Bits Encoded by C1 or C2 | Information Bits Encoded by C1 or C2 |
|---|---|---|---|
| (C1, C2) | 1 | $a_1a_2a_3$ | $b_1b_2\,b_3b_4$ |
| (C2, C1) | 0 | $b_1b_2\,b_3b_4$ | $a_1a_2a_3$ |

The constellation associated with the 8-bit multi-dimensional symbol established using symbols as shown in tables 2-5 may be similar to the constellation 406 shown in FIG. 4D.

Figure 5:
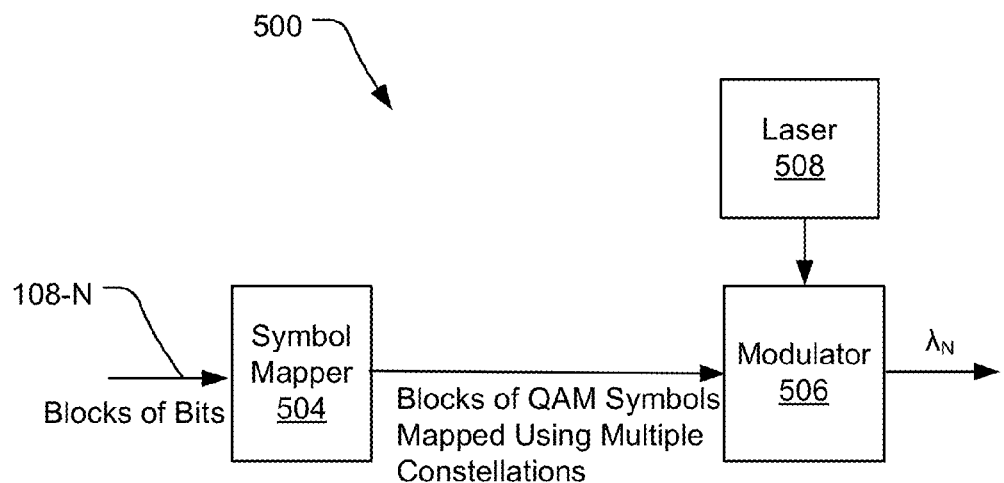
FIG. 5 is a block diagram of one exemplary embodiment of a transmitter consistent with the present disclosure.

FIG. 5 is a simplified block diagram of one exemplary transmitter 500 consistent with the present disclosure. The illustrated exemplary embodiment 500 includes a symbol mapper 504 and a modulator 506 for modulating the output of a 508, e.g. a continuous wave laser, for providing a modulated output on a carrier wavelength $\lambda_N$.

As shown, successive blocks of bits of a data stream are provided on input path 118-N N and are coupled to the symbol mapper 504. The blocks of bits or a portion thereof may be encoded with one or more FEC codes. The symbol mapper 504 is configured map each block of bits to an associated block of QAM symbols using multiple constellations to encode at least one bit in the order of the QAM symbols in a manner consistent with the present disclosure. The QAM symbols associated with each block of bits are modulated onto an optical carrier wavelength $\lambda_N$ of the laser 508 using the modulator 506. The modulator 506 may modulate the plurality of QAM symbols onto the carrier wavelength $\lambda_N$ using any known method. The output of the modulator 506 may be coupled to the multiplexer 112 (FIG. 1) in a WDM system.

Figure 6:
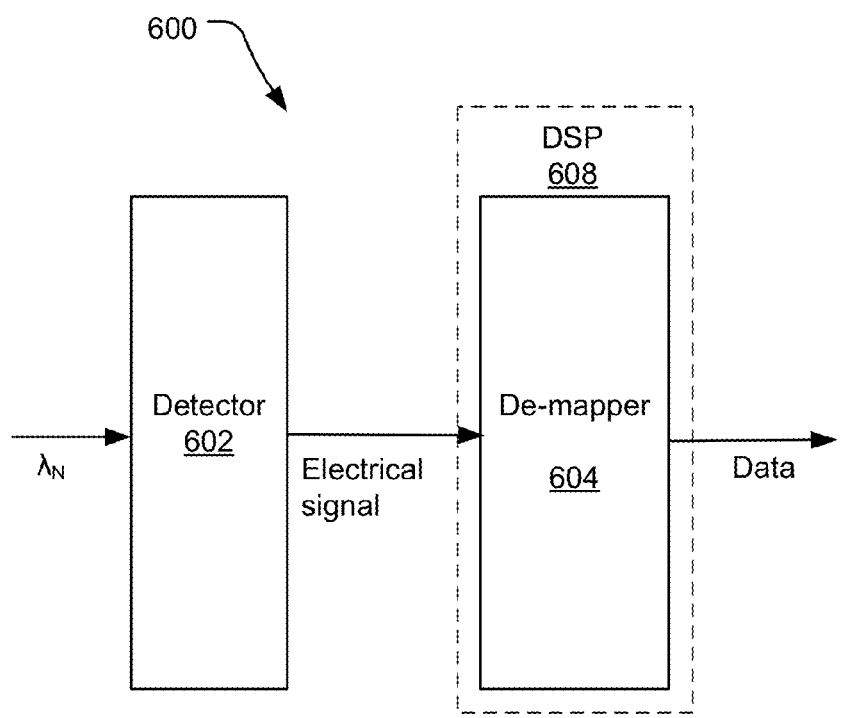
FIG. 6 is a block diagram of one exemplary embodiment of a receiver consistent with the present disclosure.

FIG. 6 is a simplified block diagram of one exemplary receiver 600 consistent with the present disclosure. The illustrated exemplary embodiment 600 includes a detector 602 and a de-mapper 604. The detector 602 may include a known coherent receiver, e.g. a polarization diversity coherent receiver, configured to receive the signal on the optical carrier wavelength $\lambda_N$ and convert the optical signal into one or more associated electrical outputs (e.g. an output associated with each polarization in a polarization multiplexed modulation format) representative of the QAM symbols modulated on the optical carrier wavelength $\lambda_N$ by the modulator 506 (FIG. 2).

The de-mapper 604 may be configured as a portion of a digital signal processing (DSP) circuit 608. In general, DSP involves processing of signals using one or more application specific integrated circuits (ASICS) and/or special purpose processors configured for performing specific instruction sequences, e.g. directly and/or under the control of software instructions. One example of a receiver incorporating a detector, i.e. a coherent receiver, and a DSP circuit using carrier phase estimation for processing the digital outputs of the coherent receiver is described in U.S. Pat. No. 8,295,713, the teachings of which are hereby incorporated herein by reference.

With reference to both FIGS. 5 and 6, the DSP circuit 608 may process the output of the detector 602 and provide an output that reproduces data provided at the input 108-N to the transmitter 500. The de-mapper 604 receives the electrical output of the detector 602 and reverses the mapping applied by the symbol mapper 504. The output of the de-mapper is a de-mapped output representative of the successive blocks of bits provided at the input 108-N to the transmitter 500. De-mapping may be performed, for example using a maximum a posteriori (MAP) detector, and may be performed iteratively in response to a priori log likelihood ratio (LLR) feedback from the output of the receiver.

The specific arrangement of the transmitter 500 consistent with the present disclosure depends on the desired modulation format and any FEC coding, and the arrangement of the receiver 600 depends on the arrangement of the transmitter 500. A variety of configurations for the transmitter 500 and/or receiver 600 are possible. Example embodiments shown and described herein are therefore presented by way of illustration and are not intended to be limiting.

Figure 7:
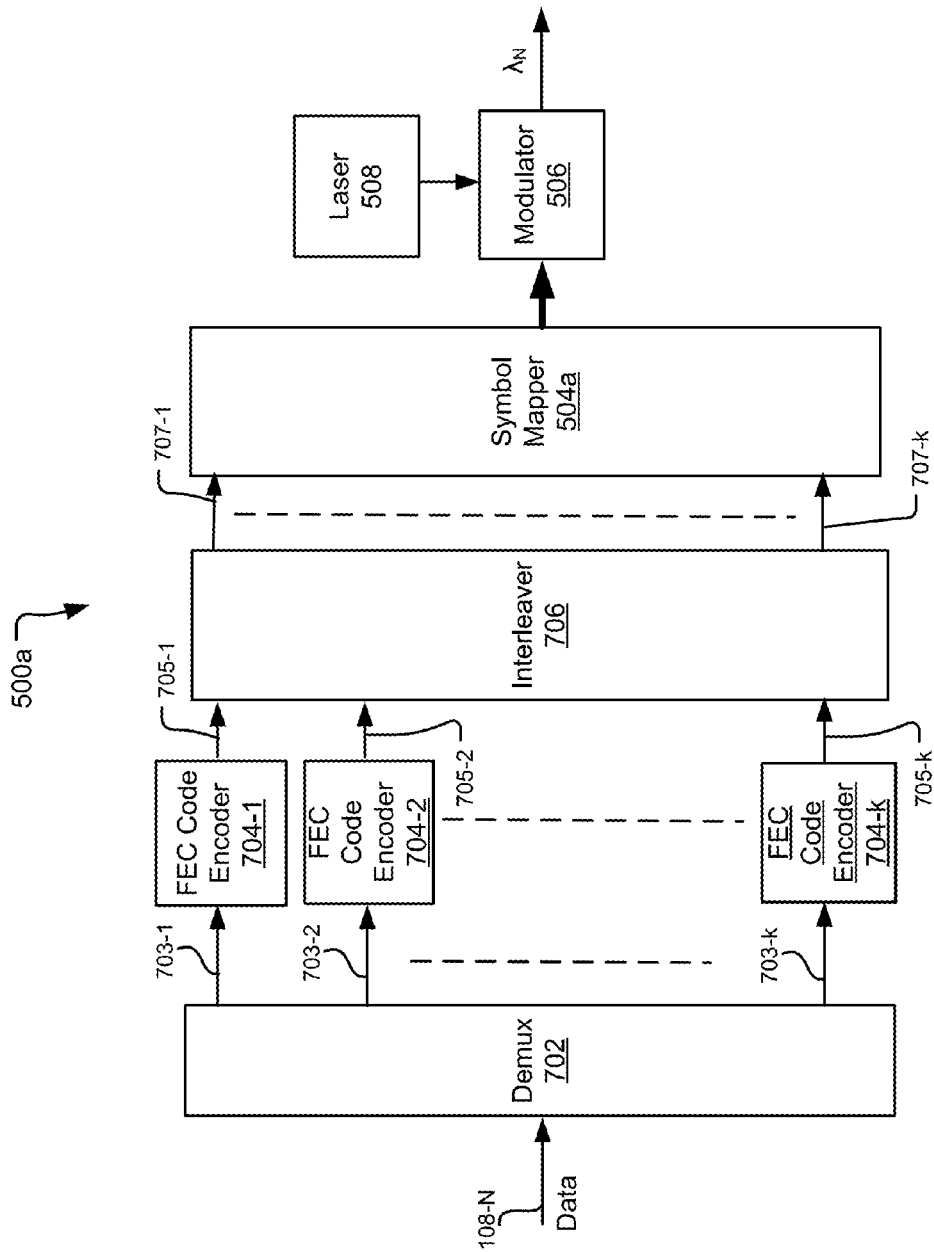
FIG. 7 is a block diagram of another exemplary embodiment of a transmitter consistent with the present disclosure.

FIG. 7, for example, illustrates an embodiment 500a of a transmitter consistent with the present disclosure using BICM. In one embodiment, for example, the transmitter 500a may be used to establish an eight-dimensional format shown in FIG. 3. The transmitter 500a includes a demultiplexer 702, a plurality of FEC code encoders 704-1, 704-2 . . . 704-k, an interleaver 706, a symbol mapper 504a and a modulator 506 for modulating the output of a laser 508 for providing a coded and modulated output on a carrier wavelength $\lambda_N$. In the illustrated embodiment, the transmitter 500a is shown as transmitting a single polarization for ease of explanation. Those of ordinary skill in the art will recognize that a transmitter consistent with the present disclosure may be configured for transmitting a polarization multiplexed (POLMUX) signal by duplicating the illustrated configuration for transmitting data on each polarization.

The demultiplexer 702 may take a known configuration for receiving a serial input data stream 118-N and demultiplexing the input data stream 118-N into k separate parallel data streams on paths 703-1, 703-2 . . . 703-k, where k is the number of bits in each block of bits to be mapped to associated symbols in a manner consistent with the present disclosure. Each of the k data streams are coupled to an associated one of the FEC code encoders 704-1, 704-2 . . . 704-k. The FEC code encoders 704-1, 704-2 . . . 704-k may each be configured to encode the data stream received thereby with an associated FEC code and provide an output data stream encoded with the FEC code on an associated output path 705-1, 705-2 . . . 705-k.

Numerous FEC codes are known, each with different properties related to how the codes are generated and consequently how they perform. Examples of known error correcting codes include the linear and cyclic Hamming codes, the cyclic Bose-Chaudhuri-Hocquenghem (BCH) codes, the convolutional (Viterbi) codes, the cyclic Golay and Fire codes, Turbo convolutional and product codes (TCC, TPC), SPC codes, and low density parity check codes (LDPC). Hardware and software configurations for implementing various error correcting codes in the FEC code encoders 704-1, 704-2 . . . 704-k and corresponding decoders 808-1, 808-2 . . . 808-k (FIG. 8) are known to those of ordinary skill in the art.

The encoded outputs 705-1, 705-2 . . . 705-k of each of the FEC code encoders 704-1, 704-2 . . . 704-k are coupled to the interleaver 706. In general, the interleaver 706 is configured to permute the order of input bits or blocks of the input bits and provide the permuted bits at an associate output. A variety of interleaver configurations are known. In the illustrated embodiment, the interleaver 706 receives output code words from the FEC encoders 704-1, 704-2 . . . 704-k and provides a parallel output of k interleaved bits, each of which interleaved bits is provided on an associated path 707-1, 707-2 . . . 707-k. Although in the illustrated embodiment, the interleaver 706 interleaves the k output bits of the FEC encoders 704-1, 704-2 . . . 704-k, those of ordinary skill in the art will recognize that other interleaving configurations may be implemented in a system consistent with the present disclosure.

The symbol mapper 504a may be configured to map the k outputs of the interleaver 706 to an APSK pair of symbols according to the constellation shown in FIG. 4A and Table 2 and a pair of QPSK symbols according to the constellation shown in FIG. 4B and Table 3. One of the outputs of the interleaver 706 may be encoded by the symbol mapper 504a in the order of the APSK and QPSK symbols at the output of the symbol mapper 504a as shown in Table 4.

The output of the symbol mapper 504a may be modulated onto an optical carrier wavelength $\lambda_N$ of a laser 508 using a known modulator 506. The encoded, mapped and modulated output of the modulator 506 may be coupled to the multiplexer 112 (FIG. 1) in a WDM system.

Figure 8:
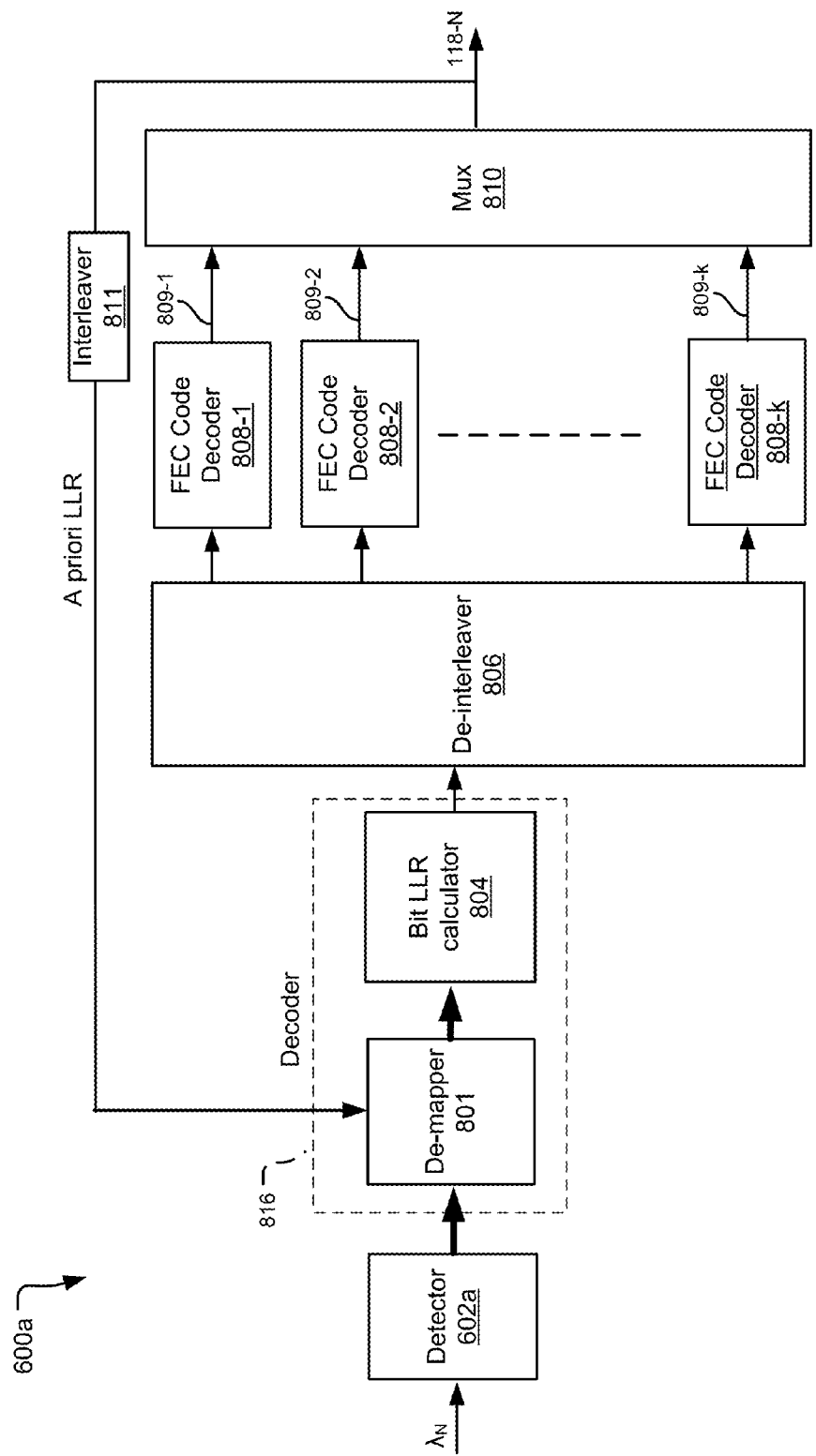
FIG. 8 is a block diagram of another exemplary embodiment of a receiver consistent with the present disclosure.

FIG. 8 is a simplified block diagram of one exemplary receiver 600a for configured for receiving a signal transmitted using the transmitter 500a shown in FIG. 7. The illustrated exemplary embodiment 600a includes a detector 602a, a decoder 816, a de-interleaver 806, a plurality of FEC code decoders 808-1, 808-2 . . . 808-k, a multiplexer 810 and an interleaver 811. The decoder 816 includes a de-mapper 801 and a bit LLR calculator 804. In the illustrated embodiment, the receiver is shown as receiving a single polarization for ease of explanation. Those of ordinary skill in the art will recognize that a receiver consistent with the present disclosure may be configured for receiving a polarization multiplexed signal (POLMUX) by duplicating the illustrated configuration for receiving data modulated on each polarization.

The detector 602a may be configured to receive the optical signal modulated on the carrier wavelength $\lambda_N$ and to convert the optical signal into a digital electrical signal. In one embodiment, for example, the detector 602a may be provided in a known coherent receiver configuration, e.g. a polarization diversity coherent receiver, with a digital signal processing (DSP) circuit. The DSP circuit may process the output of the coherent receiver to provide a digital electrical output signal to the decoder 816 and that reproduces the output signal of the symbol mapper 504a in the transmitter.

The output of the detector 602a is coupled to the decoder 816. In general, the decoder 816 decodes and de-maps the output of the detector 602a to provide an output that reproduces the output of the interleaver 706 in the transmitter 500a. In the illustrated embodiment, the output of the detector 602a is coupled to the de-mapper 801, which may be a maximum a posteriori (MAP) detector, to determine successive groups of four symbols (2 APSK symbols and 2 QPSK symbols) and provide associated symbol log likelihood ratios (LLRS) to the bit LLR calculator 804. The bit LLR calculator 804 calculates bit LLR values associated with the symbol LLRs in a known manner and the LLR associated with the bit encoded in the order of the symbols.

The bit LLR values at the output of the bit LLR calculator 804 are provided as the output of the decoder 816 and reproduce the output of the interleaver 706 in the transmitter (either in serial or parallel data streams) and are coupled to the de-interleaver 806. The de-interleaver 806 reverses the bit-interleaving performed by the interleaver 706 in the transmitter and provides k associated outputs to the FEC code decoders 808-1, 808-2 . . . 808-k. The FEC code decoders 808-1, 808-2 . . . 808-k may each be configured to decode the data stream received thereby using the FEC code and the bit LLR information received from the bit LLR calculator 804. The k decoded outputs of each of the FEC code decoders 808-1, 808-2 . . . 808-k are coupled to a known multiplexer 810. The multiplexer 810 multiplexes the k de-mapped, de-interleaved and decoded bit streams 809-1, 809-2 . . . 809-k to produce the serial digital output 118-N of the receiver.

The output 118-N is fed back to the de-mapper through the interleaver 811 to provide a priori LLR information used by the de-mapper 801 in decoding the inputs thereto. The interleaver 811 essentially reverses the de-interleaving performed by the de-interleaver.

Figure 9:
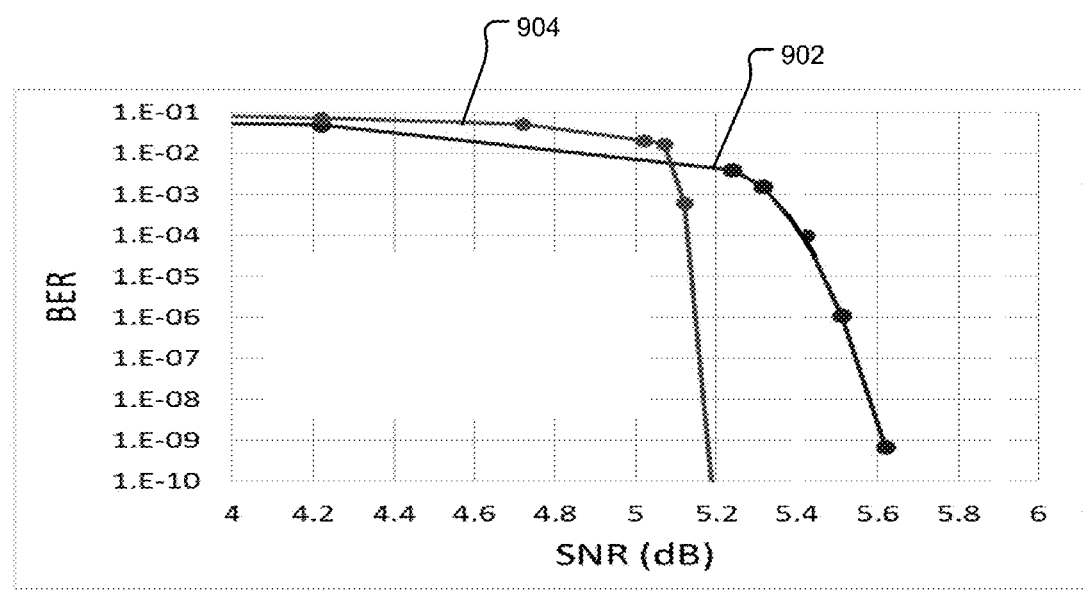
FIG. 9 is a plot of BER vs. SNR illustrating performance of one example of a modulation consistent with the present disclosure.

FIG. 9 illustrates performance of an embodiment modulated according to the scheme illustrated in FIG. 3 and using a transmitter 500a and receiver 600a as shown in FIGS. 7 and 8, respectively, and includes measured plots 902 and 904 of the bit error ratio (BER) at the output of the receiver 600a vs. signal-to-noise ratio (SNR) (dB) at the input of the receiver 600a. Plot 902 illustrates performance of a multi-dimensional modulation format including blocks of bits mapped to four QPSK symbols. Plot 904 illustrates performance of the multi-dimensional format as shown in FIG. 3 using a transmitter and receiver shown in FIGS. 7 and 8, and using an LDPC code as the FEC code. As shown, a system using a coded modulation with multiple constellations consistent with the present disclosure (plot 904) achieves a lower BER at a lower signal to noise ratio than a multi-dimensional QPSK format (plot 902). In one embodiment, the SNR threshold to achieve the same desired BER is improved from 5.9 dB for the multi-dimensional QPSK format to 5.4 dB using a format consistent with the present disclosure.

Figure 10:
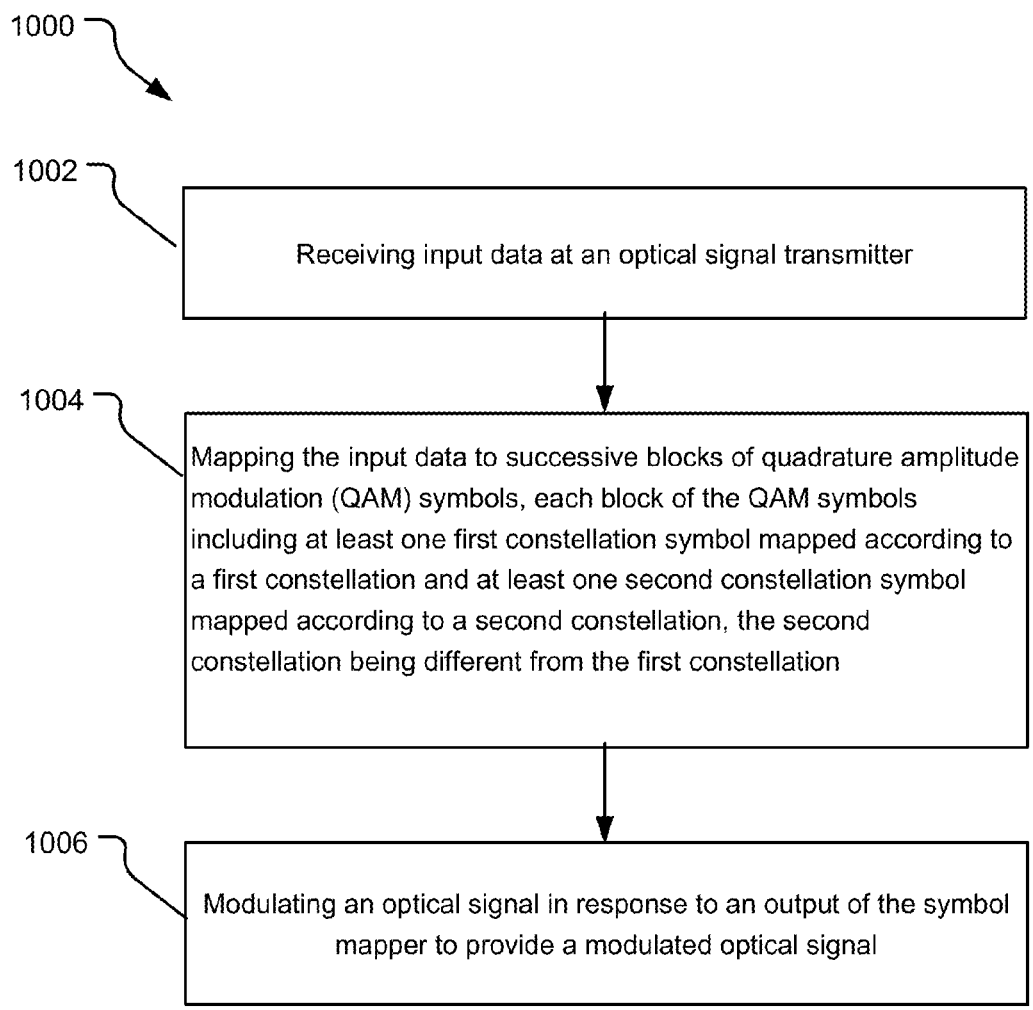
FIG. 10 is flow chart illustrating one example of a method consistent with the present disclosure.

FIG. 10 is a flow chart illustrating a method 1000 consistent with the present disclosure. Operation 1002 includes receiving input data at an optical signal transmitter. The input data is then mapped 1004 mapping the input data to successive blocks of quadrature amplitude modulation (QAM) symbols, each block of the QAM symbols including at least one first constellation symbol mapped according to a first constellation and at least one second constellation symbol mapped according to a second constellation, the second constellation being different from the first constellation. An optical signal is modulated 1006 in response to an output of the symbol mapper to provide a modulated optical signal.

While FIG. 10 illustrates various operations according to an embodiment, it is to be understood that not all of the operations depicted in FIG. 10 are necessary for other embodiments. Indeed, it is fully contemplated herein that in other embodiments of the present disclosure, the operations depicted in FIG. 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Modulating data using multiple constellations in a manner consistent with the present disclosure may be achieved in a number of different configurations. FIG. 11, for example, diagrammatically illustrates one example 1100 of modulation that may be established using blocks of QAM symbols wherein each block includes a pair of APSK symbols along with a fixed pair of QAM symbols having a fixed amplitude and phase. In the illustrated embodiment 1100, the pair of QAM symbols having fixed amplitude and phase is shown as a pair of symbols each having a real and imaginary value of 0. It is to be understood, however, that the fixed value of each symbol in the fixed pair of symbols may be different from 0 and/or the symbols in the fixed pair of symbols may have different fixed real and imaginary values.

In the illustrated exemplary embodiment, the APSK pair may represent three information bits (1.5 bits/symbol) and the fixed pair does not represent any information bits. Each symbol of the APSK pair may be mapped according to a first constellation and each symbol of the fixed pair of QAM symbols may be mapped according to a second constellation that is different from the first constellation. For example, FIG. 12A illustrates one example of a first constellation 1200 for mapping each symbol of the APSK symbol pairs shown in FIG. 11, and FIG. 12B illustrates the QAM constellation 1202 for mapping each symbol of the fixed pair symbols shown in FIG. 11.

An additional information bit may be encoded in the order of the pairs of QAM symbols. For example, to encode a digital "1" the transmitter may transmit the APSK pair mapped according to the first constellation 1200 (C1) followed by the fixed pair mapped according to the second constellation 1202 (C2), e.g. as shown in Block 1 of FIG. 11. To encode a digital "0" the transmitter may transmit the fixed pair mapped according to the second constellation 1202 (C2) followed by the APSK pair mapped according to the first constellation 1201 (C1), e.g. as shown in Block n of FIG. 11. The configuration 1100 illustrated in FIG. 11 may thus encode a total of 4 bits in the four symbols of each block (Block 1 . . . . Block n) to achieve a 1 bit/symbol spectral efficiency.

FIG. 13 illustrates another example of a modulation that may be established consistent with the present disclosure. The illustrated embodiment 1300 uses blocks of QAM symbols wherein each block (Block 1 . . . . Block n) includes a single first 8PSK symbol followed by single second 8 PSK symbol.

The first and second 8 PSK symbols in each block may each represent three information bits (3 bits/symbol) and may be mapped using first and second constellations, respectively, having different relative amplitudes. For example, FIG. 14A illustrates one example of a first constellation 1400 (C1) for mapping one of the 8 PSK symbols of each block shown in FIG. 13, and FIG. 14B illustrates one example of a second constellation 1402 (C2) for mapping the other one of the 8 PSK symbols in each block shown in FIG. 13. The relative amplitude of the constellations 1400, 1402 in FIGS. 14A and 14B are different and may be defined by the radii a and b shown in FIGS. 14A and 14B, respectively. In the illustrated embodiment the value of the radius b of the second constellation is greater than the value of the radius a of the first constellation. The average symbol energy of a symbol mapped according to the first constellation 1400 (C1) shown in FIG. 14A is $a^2$ and the average symbol energy of a symbol mapped according to the second constellation 1402 (C2) is $b^2$. Therefore, the average symbol energy of each block is $(a^2+b^2)/2$.

An additional information bit may be encoded in the order of the 8 PSK symbols in each block. For example, to encode a digital "1" the transmitter may transmit a block including an 8 PSK symbol mapped according to the first constellation 1400 (C1) followed by an 8 PSK symbol mapped according to the second constellation 1402 (C2), e.g. as shown in Block 1 of FIG. 13. To encode a digital "0" the transmitter may transmit a block including an 8 PSK symbol mapped according to the second constellation 1402 (C2) followed by an 8 PSK symbol mapped according to the first constellation 1400 (C1), e.g. as shown in Block n of FIG. 13. The configuration illustrated in FIG. 13 may thus encode a total of 7 bits in the two symbols of each block (Block 1 . . . . Block n) to achieve a 3.5 bit/symbol spectral efficiency.

In an embodiment as shown in FIG. 13, the minimum Euclidean distance between blocks of symbols may be relatively small depending on the value of the radii a and b. The minimum Euclidean distance between blocks of symbols may be normalized by the average symbol energy of each block of $(a^2+b^2)/2$. By way of example, a block of symbols in the embodiment of FIG. 13 may be described as "[C1($b_1b_2b_3$), C2($b_4b_5b_6$)]", wherein C1 indicates a symbol mapped according to the first constellation, C2 indicates a symbol mapped according to the second constellation 1402, $b_1b_2b_3$ indicates the three bits encoded by the symbol mapped according to the first constellation and $b_4b_5b_6$ indicates the three bits encoded by the symbol mapped according to the second constellation. Using that notation, the possible valid neighboring pair of symbols around [C1(000), C2(000)] are the following:

| First Symbol | Second Symbol | Distance to [C1(000), C2(000)] |
|---|---|---|
| C2(000) | C1(000) | D(1) |
| C1(001) | C2(000) | D(2) |
| C1(100) | C2(000) | D(2) |

For example, in the block [C2(000), C1(000)] the first 8 PSK symbol encodes (000) (e.g. symbol 1408 in FIG. 14B) and the second 8 PSK symbol encodes (000) (e.g. symbol 1406 in FIG. 14A). The distance from [C2(000), C1(000)] to block [C1(000), C2(000)] is:

$$D^2(1) = \frac{(b-a)^2}{a^2 + b^2} \qquad \text{Equation 1.}$$

In block [C1(001), C2(000)] the first 8 PSK symbol encodes (001) (e.g. symbol 1407 in FIG. 14A) and the second 8 PSK symbol encodes (000) (e.g. symbol 1408 in FIG. 14B). The distance from [C1(001), C2(000)] to block [C1(000), C2(000)] is:

$$D^2(2) = \frac{1.1716a^2}{a^2 + b^2} \qquad \text{Equation 2.}$$

The minimum Euclidean distance from neighboring blocks to block [C1(000), C2(000)] is $$D_{min}^2 = \max_{b/a}(\min(D^2(1), D^2(2))) \qquad \text{Equation 3.}$$

From equation 3, the minimum Euclidean distance is about 0.21, which is much less than the distance between symbols of about 0.5858 in an 8 PSK constellation.

In some embodiments, increasing the Euclidean distance between blocks can improve the performance of a system and method consistent with the present disclosure. To increase the Euclidean distance between the blocks in a system or method consistent with the present disclosure a parity constraint may be added whereby the order of the symbols in each block indicates the parity of the bits encoded by the symbols in the block. For example, if a block includes an 8 PSK symbol mapped according to the first constellation 1400 (C1) followed by an 8 PSK symbol mapped according to the second constellation 1402 (C2), e.g. as shown in Block 1 of FIG. 13, the parity of the bits encoded by the symbols in the block may be even. If a block includes an 8 PSK symbol mapped according to the second constellation 1402 (C2) followed by an 8 PSK symbol mapped according to the first constellation 1400 (C1), e.g. as shown in Block n of FIG. 13, the parity of the bits encoded by the symbols in the block may be odd.

The parity constraint reduces the information bits encoded by each block of symbols by one bit (the parity bit), which, in a configuration using two 8 PSK symbols in each block, would result in a spectral efficiency of 3 bits/symbol but creates a much larger Euclidean distance between blocks. In such an embodiment, for example, the possible valid neighboring pair of symbols around [C1(000), C2(000)] are the following

| First Symbol | Second Symbol | Parity | Distance to [C1(000), C2(000)] |
|---|---|---|---|
| C1(011) | C2(000) | Even | D(4) |
| C1(101) | C2(000) | Even | D(4) |
| C2(000) | C1(001) | Odd | D(3) |
| C2(000) | C1(100) | Odd | D(3) |

In block [C2(000), C1(001)] the first 8 PSK symbol encodes (000) (e.g. symbol 1408 in FIG. 14B) and the second 8 PSK symbol encodes (001) (e.g. symbol 1407 in FIG. 14A). The distance from [C2(000), C1(001)] to block [C1(000), C2(000)] is $$D^2(3) = \frac{2\left((a-b)^2 + \left(\frac{\sqrt{2}}{2}a\right)^2 + \left(\frac{\sqrt{2}}{2}a - b\right)^2\right)}{a^2 + b^2}$$ Equation 4.

In block [C1(011), C2(000)] the first 8 PSK symbol encodes (011) (e.g. symbol 1409 in FIG. 14A) and the second 8 PSK symbol encodes (000) (e.g. symbol 1408 in FIG. 14B). The distance from [C1(011), C2(000)] to [C1(000), C2(000)] is $$D^2(4) = \frac{4a^2}{a^2 + b^2}$$ Equation 5.

The minimum Euclidean distance from neighboring blocks to block [C1(000), C2(000)] is $$D_{min}^2 = \max_{b/a}(\min(D^2(3), D^2(4)))$$ Equation 6.

From equation 6, the minimum Euclidean distance is about 1, which is much larger than the distance between symbols of about 0.5858 in an 8 PSK constellation.

According to one aspect of the disclosure there is provided a transmitter for an optical communication system, the transmitter including: a symbol mapper configured to receive input data and map the input data to successive blocks of symbols, each block of symbols including at least one first constellation symbol mapped according to a first constellation and at least one second constellation symbol mapped according to a second constellation, the second constellation being different from the first constellation, the symbol mapper being further configured to provide each of the successive blocks of symbols with an associated order of the at least one first constellation symbol and the at least one second constellation symbol associated therewith, whereby at least one bit of the input data is mapped by the symbol mapper for each of the successive blocks of symbols based on the associated order; and a modulator coupled to the symbol mapper and configured to modulate an optical signal in response to an output of the symbol mapper to provide a modulated optical signal.

According to another aspect of the disclosure there is provided a method including receiving input data at an optical signal transmitter; mapping the input data to successive blocks of symbols, each block of symbols including at least one first constellation symbol mapped according to a first constellation and at least one second constellation symbol mapped according to a second constellation, the second constellation being different from the first constellation, and wherein the mapping comprises providing each of the successive blocks of symbols with an associated order of the at least one first constellation symbol and the at least one second constellation symbol associated therewith to map at least one bit of the input data for each of the successive blocks of symbols based on the associated order; and modulating an optical signal in response to an output of the symbol mapper to provide a modulated optical signal.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip. As used herein, use of the term "nominal" or "nominally" when referring to an amount means a designated or theoretical amount that may vary from the actual amount.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A transmitter for an optical communication system, the transmitter comprising:
   a symbol mapper configured to receive input data and map the input data to successive blocks of symbols, each block of symbols including at least one first constellation symbol mapped according to a first constellation and at least one second constellation symbol mapped according to a second constellation, the second constellation being different from the first constellation, the symbol mapper being further configured to provide each of the successive blocks of symbols with an associated order of the at least one first constellation symbol and the at least one second constellation symbol associated therewith, whereby at least one bit of the input data that is not encoded by the at least one first constellation symbol or the at least one second constellation symbol is encoded by the symbol mapper for each of the successive blocks of symbols based on the associated order; and
   a modulator coupled to the symbol mapper and configured to modulate an optical signal in response to an output of the symbol mapper to provide a modulated optical signal.

2. A transmitter according to claim 1, wherein at least one of the at least one first constellation symbol and the at least one second constellation symbol does not encode any of the input data.

3. A transmitter according to claim 1, wherein the at least one first constellation symbol has an amplitude phase shift keying (APSK) format and the at least one second constellation symbol has a quadrature amplitude modulation (QAM) format and does not encode any of the input data.

4. A transmitter according to claim 1, wherein the relative amplitudes of the at least one first constellation and the at least one second constellation are different.

5. A transmitter according to claim 1, wherein the at least one first constellation symbol comprises a single one of the first constellation symbols and the at least one second constellation symbol comprises a single one of the second constellation symbols.

6. A transmitter according to claim 1, wherein the at least one first constellation symbol comprises a single 8-phase shift keying (8PSK) format symbol and the at least one second constellation symbol comprises a single 8PSK format symbol.

7. A transmitter according to claim 1, wherein parity of the input data is indicated by the associated order.

8. A method comprising:
   receiving input data at an optical signal transmitter;
   mapping the input data to successive blocks of symbols, each block of symbols including at least one first constellation symbol mapped according to a first constellation and at least one second constellation symbol mapped according to a second constellation, the second constellation being different from the first constellation, and wherein the mapping comprises providing each of the successive blocks of symbols with an associated order of the at least one first constellation symbol and the at least one second constellation symbol associated therewith to encode at least one bit of the input data that is not encoded by the at least one first constellation symbol or the at least one second constellation symbol for each of the successive blocks of symbols based on the associated order; and
   modulating an optical signal in response to an output of the symbol mapper to provide a modulated optical signal.

9. A method according to claim 8, wherein at least one of the at least one first constellation symbol and the at least one second constellation symbol does not encode any of the input data.

10. A method according to claim 8, wherein the at least one first constellation symbol has an amplitude phase shift keying (APSK) format and the at least one second constellation symbol has a quadrature amplitude modulation (QAM) format and does not encode any of the input data.

11. A method according to claim 8, the method further comprising setting the relative amplitude of the at least one first constellation and the at least one second constellation to be different.

12. A method according to claim 8, wherein the at least one first constellation symbol comprises a single one of the first constellation symbols and the at least one second constellation symbol comprises a single one of the second constellation symbols.

13. A method according to claim 8, wherein the at least one first constellation symbol comprises a single 8-phase shift keying (8PSK) format symbol and the at least one second constellation symbol comprises a single 8PSK format symbol.

14. A method according to claim 8, wherein the mapping comprises indicating a parity of the input data by the associated order.

\* \* \* \* \*